US009276729B2

(12) United States Patent
Clausen et al.

(10) Patent No.: US 9,276,729 B2
(45) Date of Patent: Mar. 1, 2016

(54) DETERMINATION OF A NOISE AND INTERFERENCE COVARIANCE MEASURE

(71) Applicant: Intel Mobile Communications GmbH, Neubiberg (DE)

(72) Inventors: Axel Clausen, Munich (DE); Franz Eder, Burgthann (DE)

(73) Assignee: Intel Deutschland GmbH, Neubiberg (DE)

( * ) Notice: Subject to any disclaimer, the term of this patent is extended or adjusted under 35 U.S.C. 154(b) by 257 days.

(21) Appl. No.: 13/707,738

(22) Filed: Dec. 7, 2012

(65) Prior Publication Data

US 2014/0160949 A1    Jun. 12, 2014

(51) Int. Cl.
*H04L 5/00* (2006.01)

(52) U.S. Cl.
CPC ............. *H04L 5/0073* (2013.01); *H04L 5/0007* (2013.01)

(58) Field of Classification Search
None
See application file for complete search history.

(56) References Cited

U.S. PATENT DOCUMENTS

| 6,252,540 | B1* | 6/2001 | Hale et al. ..................... 342/159 |
| 6,567,462 | B1* | 5/2003 | Brunner et al. ................ 375/148 |
| 6,718,184 | B1* | 4/2004 | Aiken et al. ................... 455/562.1 |
| 8,462,899 | B2* | 6/2013 | Wang et al. .................... 375/346 |
| 2004/0046695 | A1* | 3/2004 | Brothers et al. .............. 342/427 |
| 2004/0230387 | A1* | 11/2004 | Bechhoefer ..................... 702/58 |
| 2005/0157776 | A1* | 7/2005 | Ryu ............................... 375/148 |
| 2007/0111746 | A1* | 5/2007 | Anderson ....................... 455/522 |
| 2010/0284499 | A1* | 11/2010 | Lindoff .......................... 375/346 |
| 2010/0303162 | A1* | 12/2010 | Wang et al. .................... 375/260 |
| 2011/0013556 | A1* | 1/2011 | Molnar et al. ................. 370/328 |
| 2011/0274350 | A1* | 11/2011 | Hara ............................. 382/167 |
| 2012/0093143 | A1* | 4/2012 | Sun et al. ...................... 370/338 |
| 2014/0119262 | A1* | 5/2014 | Park et al. ..................... 370/312 |
| 2014/0160949 | A1* | 6/2014 | Clausen et al. ............... 370/252 |

OTHER PUBLICATIONS

"Performance of Interference Rejection Combining Receiver for LTE", 3GPP TSG RAN WG4 Meeting #59AH, Bucharest, Romania Jun. 27-Jul. 1, 2011, p. 1-10.
"CRS Interference Cancellation in HetNet Scenarios for UE Performance", 3GPP TSG RAN WG1 Meeting #66, Athens, Greece, Aug. 22-26, 2011, p. 1-3.
"Enabling Communication in Harsh Interference Scenarios", 3GPP TSG-RAN WG4 AH#10-03, Jun. 28-Jul. 2, 2010, Bratislava, Slovakia, p. 1-11.

* cited by examiner

*Primary Examiner* — Diane Lo
(74) *Attorney, Agent, or Firm* — Eschweiler & Associates, LLC (57) ABSTRACT

A method includes receiving a signal including a two-dimensional signal pattern in a time-frequency representation, the two-dimensional signal pattern including first reference resource elements at predetermined positions in the two-dimensional signal pattern. The method further includes determining a first covariance measure based on the first reference resource elements of the signal pattern. The method further includes determining a second covariance measure based on resource elements of the signal pattern different from the first reference resource elements. The method further includes determining a noise and interference covariance measure of the received signal based on the first covariance measure and based on the second covariance measure.

20 Claims, 5 Drawing Sheets

DETERMINATION OF A NOISE AND INTERFERENCE COVARIANCE MEASURE

FIELD

The invention relates to a technique of determining a noise and covariance measure of a received signal, in particular of a received radio signal according to a Long Term Evolution standardization, for example.

BACKGROUND

Modern cellular networks face the challenge that the demand for data traffic is increasing dramatically. Network operators need to modify their networks to increase the overall capacity. One solution may be to place denser macro cells. However, this solution may be very costly and rapidly moving users might be required to perform handovers very frequently. Another solution may be heterogeneous networks. One macro cell may be used for coverage of a larger area and pico or femto cells may be placed into the coverage area to increase the capacity at some "hot spots". The deployment of femto and pico cells may be less expensive compared to new macro cells, may increase the coverage, and may increase the overall data throughput of the network. However, it may generate as well strong interference scenarios, especially if the operator targets a frequency reuse of one, i.e., all macro/pico/femto cells transmit in the same frequency band.

The 3GPP standardization has introduced enhanced inter-cell interference coordination (eICIC) in Release 10 of LTE to support a deployment of heterogeneous networks. Time-domain eICIC introduces almost blank sub-frames (ABS) at aggressor cells. During these sub-frames, a UE connected to the victim cell and facing strong interference from the aggressor cells, may be able to receive data from the victim cell. However, during these ABS sub-frames, the aggressor cells may continue to transmit cell specific reference signals (CRS)—these CRS signals may degrade the overall data throughput of conventional technologies significantly. It may thus be desirable to provide a method and a device to improve the data throughput in a time-domain eICIC scenario such that the performance improvement is significant and the computational complexity is smaller than for known solutions.

A similar interference scenario arises as well in a synchronized network without eICIC scheduling: if an aggressor cell does not schedule a PDSCH transmission for a particular resource block then it continues to transmit the CRS signals in this resource block. The invention can as well be applied in such a scenario.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
eICIC: enhanced inter-cell interference coordination,
ABS: almost blank sub-frames,
CRS: cell specific reference signal,
RE: resource element,
IRC: interference rejection combining,
MMSE: minimum mean square error,
LTE: Long Term Evolution,
LTE-A: LTE Advanced, Release 10 and higher versions of LTE,
RF: Radio Frequency,
UE: User Equipment,
PDSCH: physical downlink shared channel,
MBSFN: multicast/broadcast over single frequency network,
INR: interference to noise ratio,
MCS: modulation coding scheme,
EVA: extended vehicular A channel,
QPSK: quadrature phase shift keying,
QAM: quadrature amplitude modulation,
RBSF: resource block subframe, i.e., a resource block in frequency direction times subframe in time direction.

The methods and devices described herein may be based on two-dimensional signal patterns, reference resource elements and covariance measures. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on an LTE and/or an OFDM standard. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed to implement mobile standards such as e.g. the Long Term Evolution (LTE) standard. LTE (Long Term Evolution), marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements. The standard is developed by the 3GPP (3rd Generation Partnership Project) and is specified in its Release 8 document series, with enhancements described in Releases 9, 10 and 11.

In the following, Orthogonal frequency-division multiplexing (OFDM) systems are described. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a frequency-division multiplexing (FDM) scheme used as a digital multi-carrier modulation method. A large number of closely spaced orthogonal sub-carrier signals may be used to carry data. The orthogonality may prevent crosstalk between sub-carriers. The data may be divided into several parallel data streams or channels, one for each sub-carrier. Each sub-carrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to coded OFDM (COFDM) and discrete multi-tone modulation (DMT).

In the following, covariance measures, covariance matrices, signal covariance measures, noise covariance measures and signal and interference covariance measures are described. The covariance measure generalizes the notion of variance to multiple dimensions. As an example, the variation in a collection of random points in two-dimensional space cannot be characterized fully by a single number, nor would the variances in the x and y directions contain all of the necessary information; a 2×2 measure called the covariance measure would be necessary to fully characterize the two-dimensional variation. The covariance measure can be mathematically implemented as a covariance matrix.

In probability theory and statistics, a covariance matrix (also known as dispersion matrix or variance covariance matrix) is a matrix whose element in the position i, j is the covariance between the $i^{th}$ and $j^{th}$ elements of a random vector (that is, of a vector of random variables). Each element of the vector may be a scalar random variable, either with a finite number of observed empirical values or with a finite or infinite number of potential values specified by a theoretical joint probability distribution of all the random variables.

If the entries in a column vector $$X = \begin{bmatrix} X_1 \\ \vdots \\ X_n \end{bmatrix} \qquad (1)$$

are random variables, each with finite variance, then the covariance matrix S may be the matrix whose entry (i, j) is the covariance $$\Sigma_{i,j} = \text{cov}(X_i, X_j) = E[(X_i - \mu_i)(X_j - \mu_j)], \qquad (2)$$

wherein $$\mu_i = E(X_i) \qquad (3)$$

is the expected value of the i-th entry in the vector X.

In the following, multi-layer heterogeneous networks, macro cells, pico cells, femto cells, target cells, and interfering cells are described. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes. These eNodeBs may commonly be referred to as macro eNodeBs (MeNB) or macro cells, pico eNodeBs (PeNB) or pico cells and femto/home eNodeBs (HeNB) or femto cells and meant for basic outdoor, outdoor hot-zone and indoor/enterprise coverage, respectively.

Macro cells may cover a large cell area (typical cell radius being of the order of 500 meters to a kilometer), with transmit antennas above the clutter and transmission power of the order of 46 dBm (20 watts). They may provide service to all users. Femto cells, also called Home eNodeBs (HeNBs) may be lower power cells installed (typically indoors) by an end-consumer. Pico cells may be operator deployed cells, with lower transmission powers—typically an order of magnitude smaller—relative to macro cell eNodeBs. They may be installed typically in wireless hotspot areas (for example, malls) and provide access to all users. In a scenario where a UE is connecting to pico cells, the pico cell may represent the target cell while the macro cell may represent the interfering cell providing strong interference.

In the following, enhanced intercell interference coordination (eICIC) and almost blank sub-frames (ABS) are described. Enhanced intercell interference coordination is used in Release 10 3GPP to avoid heavy inter-cell interference on both data and control channels of the downlink. eICIC may be based on carrier aggregation with cross-carrier scheduling or based on time-domain multiplexing (TDM) using so called almost blank sub-frames (ABS).

ICIC based on Carrier Aggregation may enable an LTE-A UE to connect to several carriers simultaneously. It not only may allow resource allocation across carriers, it also may allow scheduler based fast switching between carriers without time consuming handover. A simple principle in a HetNet scenario may be to partition the available spectrum into e.g. two separate component carriers and assign the primary component carriers (PCC) to different network layers. The primary component carrier may be the cell that provides the control information to the UEs. Each network layer can additionally schedule UEs on other CCs called secondary component carriers (SCC).

ICIC based on Time Domain Multiplexing may periodically mute transmissions from eNodeBs inflicting severe interference onto others for entire sub-frames, so that the victim eNodeBs may have a chance to serve their UEs suffering from severe interference from the aggressor eNodeB in these sub-frames. This muting is not necessarily complete, as certain signals such as Common reference symbols (unless configured as MBSFN sub-frame), Primary and secondary synchronization signals (PSS and SSS), Physical broadcast channel (PBCH), SIB-1 and paging with their associated PDCCH may have to be transmitted even in otherwise muted sub-frames e.g. to avoid radio link failure or for reasons of backwards compatibility. Collisions of sub-frame muting with PSS, SSS, SIB-1 and paging should be minimized. Hence, muting in sub-frames #0, #1, #5 and #9 should be avoided as far as possible. Sub-frames thus muted may be referred to as almost blank sub-frames (ABS).

In the following, whitening filters, IRC receivers and MIMO detectors are described. Noise (and other additive distortions) usually has a non-flat amplitude spectrum. A noise whitening filter may equalize the spectrum of the signal, making it similar to the white noise spectrum. Noise whitening filters may enhance low level spectral components and may attenuate high level ones.

Interference Rejection Combining (IRC) is a technique that may be used in an antenna diversity system to suppress co-channel interference by using the cross covariance between the noise in diversity channels. Interference rejection combining (IRC) may be used as an efficient alternative to increase uplink bit rates in areas where cells overlap. The interference rejection combining (IRC) receiver may be effective in improving the cell-edge user throughput because it may suppress inter-cell interference. The IRC receiver may be typically based on a minimum mean square error (MMSE) criteria, which may require channel estimation and covariance matrix estimation including the inter-cell interference with high accuracy.

Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which is described by the channel matrices between respective antennas of the transmitter and respective antennas of the receiver.

Figure 1:
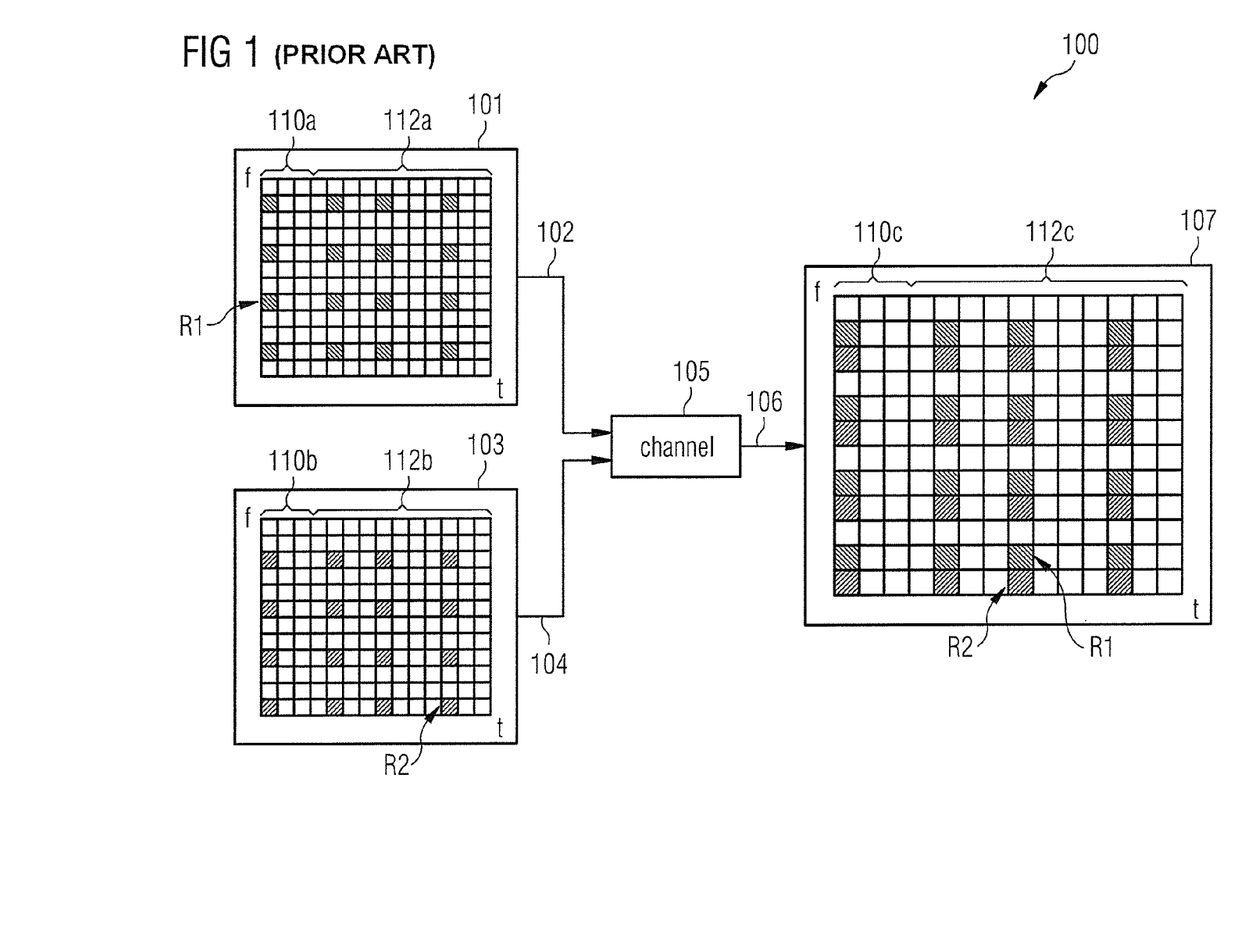
FIG. 1 is a schematic diagram of a received RBSF (resource block in frequency direction times subframe in time direction) in a communication system 100 including a mobile device 107 receiving a target signal 102 of a target cell 101. The target signal 102 is interfered by an interfering signal 104 of an interfering cell 103 when transmitted over a communication channel 105.

FIG. 1 is a schematic diagram of a received RBSF (resource block in frequency direction times subframe in time direction) in a communication system 100 including a mobile device 107 receiving a target signal 102 of a target cell 101. The target signal 102 is interfered by an interfering signal 104 of an interfering cell 103 when transmitted over a communication channel 105.

The target signal 102 of the target cell 101 may be represented as a two-dimensional signal pattern in time-frequency domain, e.g. according to an LTE frame structure. The signal pattern may be structured as a two-dimensional grid carrying multiple resource elements which may be designated as small squares forming the grid. The dark resource elements R1 can be designated as first reference resource elements. They may be arranged in a regular pattern over the two-dimensional signal pattern. This regular pattern may be a predetermined one which may be used for characterizing the target cell 101 as a kind of stamp or mark. The white resource elements may be partitioned in a control region 110a in the left section of the grid and in a data region 112a in the right section of the grid.

In a similar manner, the interfering signal 104 of the interfering cell 103 may also be represented as a two-dimensional signal pattern in time-frequency domain, e.g. according to an LTE frame structure, structured as a two-dimensional grid carrying multiple resource elements forming the grid. The dark resource elements R2 can be designated as second reference resource elements. They may be arranged in a similar manner as the first reference resource elements R1 in a regular pattern over the two-dimensional signal pattern. This regular pattern may be a predetermined one which is used for characterizing the interfering cell 103. However, the regular pattern of the second reference resource elements R2 may be different from the regular pattern of the first reference resource elements R1 in order to be able to differentiate between target cell 101 and interfering cell 103. The white resource elements may be partitioned in a control region 110b in the left section of the grid and in a data region 112b in the right section of the grid.

Both, target signal 102 of the target cell 101 and interfering signal 104 of the interfering cell 103 may be transmitted over a communication channel 105. In the communication channel 105 both signals 102, 104 may be superimposed, thereby forming a common signal as receive signal 106 which may be received by the mobile device 107.

The receive signal 106 received by the mobile device 107 may also be represented as a two-dimensional signal pattern in time-frequency domain, e.g. according to an LTE frame structure, structured as a two-dimensional grid carrying multiple resource elements forming the grid. Due to the superposition of the target signal 102 and the interfering signal 104, the first reference resource elements R1 and the second reference resource elements R2 may be arranged at the same positions in the time-frequency grid of the receive signal 106 as they were arranged in the time-frequency grids of the target signal and the interfering signal, respectively. That is, the first reference resource elements R1 may be arranged at the same positions of the two-dimensional signal pattern of the receive signal 106 than they are arranged in the two-dimensional signal pattern of the target signal 102; and the second reference resource elements R2 may be arranged at the same positions of the two-dimensional signal pattern of the receive signal 106 than they are arranged in the two-dimensional signal pattern of the interfering signal 104. The white resource elements may be partitioned in a control region 110c in the left section of the grid and in a data region 112c in the right section of the grid.

Figure 2:
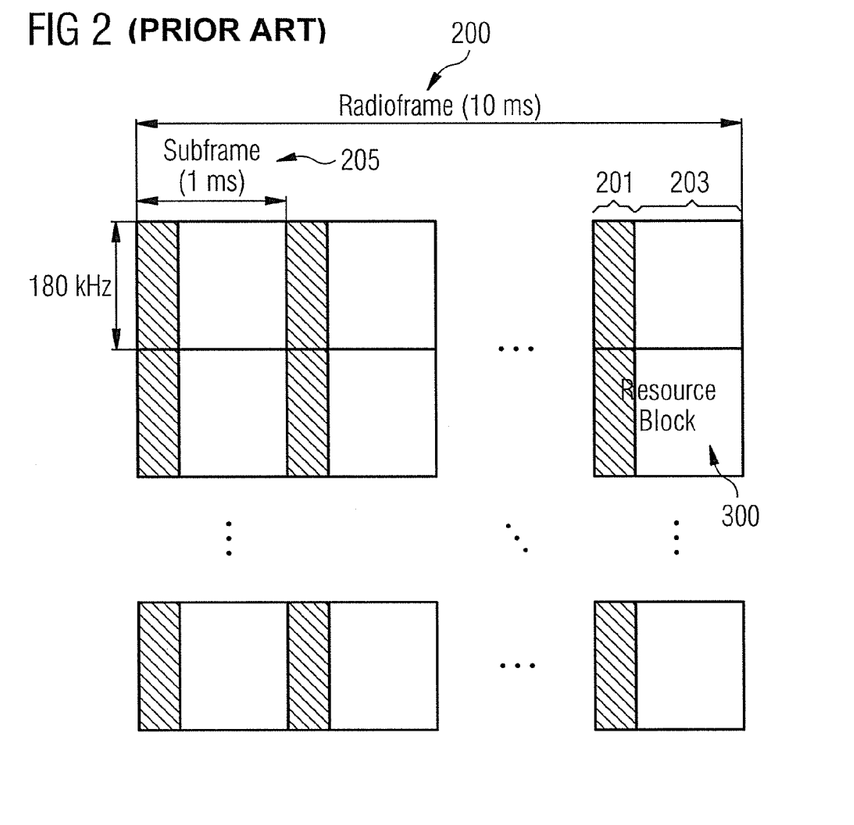
FIG. 2 is a schematic time-frequency representation of an LTE radio frame 200 including multiple sub-frames 205, each sub-frame 205 including multiple resource blocks 300.
Figure 3:
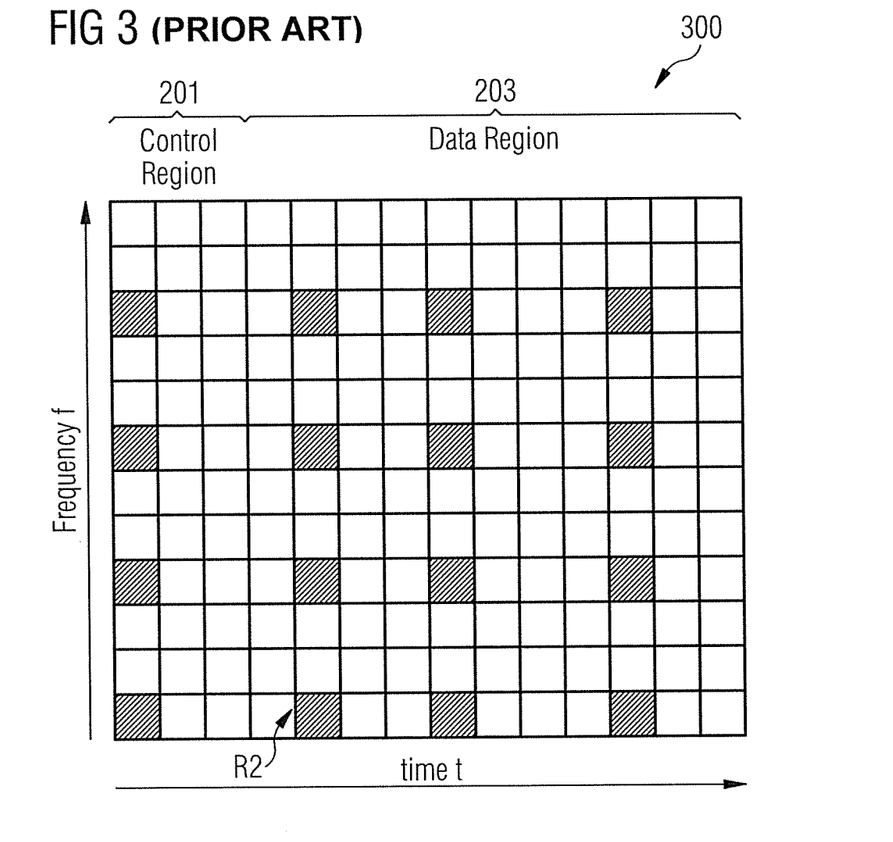
FIG. 3 is a schematic time-frequency representation of a block covering one resource block in the frequency direction and one subframe in the time direction 300 as depicted in FIG. 2.

An example for the two-dimensional signal pattern of the interfering signal 104 which may also be denoted as "resource block" or more particular as "RBSF" (resource block subframe) is illustrated in FIGS. 2-3. An RBSF may be defined as a block having a length of one resource block (e.g. 180 kHz) in the frequency direction and a length of one subframe (e.g. 1 ms) in the time direction. An RBSF 300 is given in FIG. 3 that will be described below. The illustration of FIG. 3 can be analogously applied to the target signal 102 when the reference resource elements are arranged at different positions. An example for a radio frame 200 including multiple such resource blocks 300 is illustrated in FIG. 2.

The mobile device 107 illustrated in FIG. 1 includes a processing circuit for processing a method as described below with respect to FIG. 4.

In an exemplary implementation, the two-dimensional signal pattern includes a resource block of an Orthogonal Frequency Division Multiplexing system. In an exemplary implementation, the received signal 106 includes a radio signal including a plurality of radio frames, each radio frame including a plurality of sub-frames and each sub-frame including a plurality of subcarriers as described below with respect to FIG. 3. In an exemplary implementation, the two-dimensional signal pattern includes a resource block determined by a sub-frame and a portion of the plurality of subcarriers as described below with respect to FIG. 2. In an exemplary implementation, the target cell 101 and the interfering cell 103 may be dimensioned according to a Long Term Evolution standardization, in particular to Release 10 or higher thereof, including enhanced inter-cell interference coordination. In an exemplary implementation, the target cell 101 may be a pico cell and the interfering cell 103 may be a macro cell of a heterogeneous Long Term Evolution network.

In a time-domain eICIC scenario with non-colliding common reference signals (CRS), a UE at the cell boundary of a victim cell may be scheduled during ABS sub-frames of the aggressor cells. During an ABS sub-frame, the interference for PDSCH transmission may be reduced significantly—however, the aggressor cells may continue to transmit CRS signals (there exists a second possibility of scheduling MBSFN-ABS sub-frames; these sub-frames do not transmit any CRS signals—however, many network operators prefer not to schedule any MBSFN-ABS sub-frames). The CRS signals do not collide with the CRS signals of the victim cell and may present a significant disturbance for the PDSCH transmission. In FIG. 1, one exemplary RBSF received at the UE 107 is illustrated.

The blocks denoted with R1 mark resource elements utilized by the CRS signals of the victim cell, i.e. the target cell 101. The blocks denoted with R2 mark resource elements which experience strong interference due to the CRS signals of the aggressor cell 103. The remaining blocks mark the control region, i.e. resource elements used for data control and the data region, i.e. resource elements used for data transmission. The detailed structure of a resource block is illustrated below with respect to FIG. 2.

A linear receiver with MMSE-IRC (interference rejection combining) or a whitening filter followed by a MMSE receiver as described below with respect to FIG. 5 may improve the data throughput in such a scenario compared to a normal MMSE receiver. The proposed method can as well be applied to any other detector as, for example, a sphere decoder.

FIG. 2 is a schematic time-frequency representation of an LTE radio frame 200 including multiple sub-frames 205 each sub-frame 205 including multiple resource blocks 300.

In LTE Release 8 and higher, OFDM may be the downlink (DL) multiple access scheme, while single-carrier frequency-division multiple access (SC-FDMA) may be the uplink (UL) multiple access scheme. LTE Release 8 and higher may also support scaleable bandwidth up to 20 MHz, and may use DL/UL frequency selective and DL frequency diverse scheduling, respectively. The DL sub-frame structure may be common to both time-division duplex (TDD) and frequency division duplex (FDD), and is shown in FIG. 2 using user specific dedicated reference symbols and a normal cyclic prefix. Each sub-frame 205 may consist of two slots of length 0.5 ms (7 OFDM symbols for normal cyclic prefix) with reference symbols located within each slot. DL control signaling 201 may be located in the first n OFDM symbols where n is smaller or equal than 3 and can be dynamically changed every sub-frame, followed by data transmission 203. Each element in the time and frequency resource grid may be called a "resource element" (RE). A plurality of resource elements may form a block of dimension resource blocks in the frequency direction and subframe in the time direction (RBSF) 300 as described below with respect to FIG. 3.

FIG. 3 is a schematic time-frequency representation of a resource block 300 as depicted in FIG. 2.

Each DL sub-frame 205 as depicted in FIG. 2 may contain reference signals R2, control information 201, and data transmission 203. Users are assigned data allocation in units of resource blocks (RBs) 300, where a resource block may be defined as 12 resource elements by one slot. The structure of a resource block 300 is illustrated in FIG. 3. The UL sub-frame structure may be common for both FDD and TDD. Similar to the DL, each UL sub-frame may consist of two slots of length 0.5 ms (7 DFT-S-OFDM symbols for normal cyclic prefix) with one reference symbol located within each slot.

Figure 4:
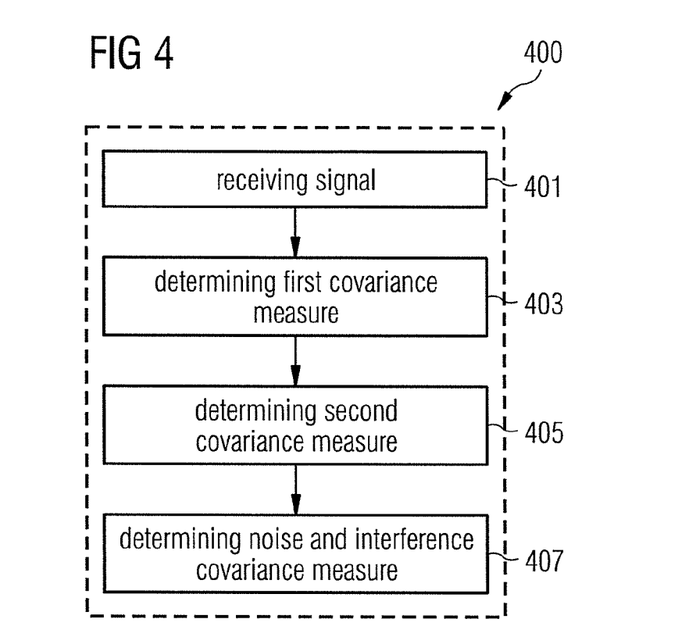
FIG. 4 is a schematic diagram of a method 400 for receiving a signal including first reference resource elements.

FIG. 4 is a schematic diagram of a method 400 for receiving a signal including first reference resource elements. The method 400 can be applied in a mobile device 107 as described above with respect to FIG. 1.

The method 400 includes receiving a signal 106 including a two-dimensional signal pattern in a time-frequency representation at 401, the two-dimensional signal pattern including first reference resource elements R1 at predetermined positions in the two-dimensional signal pattern. The method 400 further includes determining a first covariance measure based on the first reference resource elements R1 of the signal pattern at 403. The method 400 further includes determining a second covariance measure based on resource elements of the signal pattern different from the first reference resource elements R1 at 405. The method 400 further includes determining a noise and interference covariance measure of the received signal 106 based on the first covariance measure and based on the second covariance measure at 407.

The method 400 thus determines a first covariance measure, e.g. a covariance matrix, based on the first reference resource elements R1 and a second covariance measure, e.g. a covariance matrix, based on any other resource elements which are not equal to the first reference resource elements R1. Both covariance measures are used for determining the noise and interference covariance measure, e.g. the noise and interference covariance matrix. That means, the method 400 distinguishes between cell specific reference signal (CRS) resource elements of the receive signal 106 and other resource elements. Therefore, the noise and interference measure is determined based on two different covariance measures instead of being determined from a single covariance measure, e.g. the covariance measure determined from the cell specific reference signal (CRS) resource elements of the receive signal 106.

In an implementation form of the method 400, the covariance measures may be covariance matrices. The first and second covariance matrices may be estimated for each resource block 200 as depicted in FIG. 2. The covariance matrix computed from the CRS resource elements of the victim cell, i.e. the first covariance matrix computed from the first reference resource elements R1 of the target cell 101 may be used for all resource elements 200 which are not affected by any CRS interference. For all resource elements 200 which are affected by CRS interference, a new covariance matrix, i.e. the second covariance matrix may be determined or estimated.

If more than one aggressor cell, i.e. interfering cells 103 are present, then more covariance matrices may be estimated. The CRS elements of the aggressor cells, i.e. of all different interfering cells 103, may be located on different resource elements. For an Almost Blank Sub-frame (ABS) with non-colliding CRS of an aggressor cell, the noise and interference covariance matrix may be different on all resource elements which may have CRS interference from one or more aggressor cells. Therefore, the determining of the noise and interference covariance matrix from separate covariance matrices for each aggressor cell, i.e. interfering cell, may result in a better estimation than determining the noise and interference covariance matrix from only a single covariance matrix.

The presented method 400 may require only a small number of operations and small memory compared to e.g. CRS cancellation. It may work as well if multiple aggressor cells are present and the performance does not necessarily depend on the strength of the aggressor.

For a better understanding of the method 400 which may be implemented in the mobile device 107 described above with respect to FIG. 1, the terms described in the following are introduced.

A MIMO receiver can be described by the following relations. $N_{tx}$ denotes the number of transmit antennas, and $N_{rx}$ number of receive antennas. $N_{agressor}$ denotes the number of non-colliding CRS aggressor cells that may have almost blank sub-frame (ABS). Note that the case is addressed where the number of colliding CRS aggressor cells is zero. $\mathbb{S}$ denotes the set of all resource elements (RE) (k, l) of the sub-frame under consideration with frequency-domain index k and time-domain index l. $\mathbb{S}_{CRS}$ denotes the subset of $\mathbb{S}$ of CRS RE of the victim cell. $\mathbb{S}_{data}$ denotes the subset of $\mathbb{S}$ of victim cell data RE.

$I_{agressor}(k,l) \subseteq \{1, 2, \ldots, N_{agressor}\}$ denotes the index set of aggressor cells that may have CRS at resource element $(k, l) \in \mathbb{S}_{data}$. For $I\{1, 2, \ldots, N_{agressor}\}$, the relation)

$$\mathbb{S}_{data}(I) := \{(k,l) \in \mathbb{S}_{data} : I_{agressor}(k,l) = I\} \quad (4)$$

may be defined. y(k, l) denotes a $\mathbb{C}^{N_{rx} \times 1}$-valued random variable modeling the received signal for RE(k, l)$\in \mathbb{S}$. In case of (k, l)$\in \mathbb{S}_{data}$ and (k, l) having CRS interference of Iaggressor (k, l), the following equation holds $$y(k, l) = H_0(k, l)s_0(k, l) + \sum_{i \in I_{aggressor}(k,l)} H_i(k, l)s_i^{CRS}(k, l) + n(k, l), \quad (5)$$

where $s_0(k, l)$ is a $\mathbb{C}^{N_{tx} \times 1}$-valued random variable modeling the transmitted desired signal, the $\mathbb{C}^{N_{tx} \times 1}$-valued random variable $s_i^{CRS}(k, l)$ models the transmitted CRS signal for aggressor $i \in I_{agressor}(k, l)$, and $H_i(k, l) \in \mathbb{C}^{N_{rx} \times N_{tx}}$ are the corresponding channel matrices.

In an ABS subframe and in case of $(k, l) \in \mathbb{S}_{CRS}$, as assumed no colliding aggressor CRS, the following relation holds $$y(k,l) = H_0(k,l)s_0^{CRS}(k,l) + n(k,l), \quad (6)$$

where $s_0^{CRS}(k, l)$ is a $\mathbb{C}^{N_{tx} \times 1}$-valued random variable modeling the transmitted CRS of the victim cell.

n(k, l) may be a $\mathbb{C}^{N_{rx} \times 1}$-valued strictly circular symmetric normally distributed random variable modeling the additive noise for RE (k, l)$\in \mathbb{S}$.

In a linear detector, the desired signal $s_0(k, l)$ for RE (k, l)$\in \mathbb{S}_{data}$ may be recovered at the receiver by multiplying the received signal with a weight W(k, l)$\in \mathbb{C}^{N_{tx} \times N_{rx}}$, i.e.

$$\hat{s}_0(k,l) = W(k,l)y(k,l) \quad (7)$$

It is noted that, in the remainder of this specification, the RE (km is removed for easier readability.

For each RBSF, multiple different covariance matrix estimations may be required. The first one may be denoted as Covariance Matrix Estimation for all RE without CRS Interference. This may be used for estimating the noise covariance matrix $\hat{R}_n$ based on y the CRS resource elements from $\mathbb{S}_{CRS}$ of the victim cell, i.e.

$$\hat{n}^{CRS} = y - \hat{H}_0 s_0^{CRS} \quad (8)$$
$$= (H_0 - \hat{H}_0)s_0^{CRS} + n$$

and $$\hat{R}_n^{CRS} = E[\hat{n}^{CRS}(\hat{n}^{CRS})^H] \quad (9)$$
$$= E[(H_0 - \hat{H}_0)(H_0 - \hat{H}_0)^H] + R_n$$
$$= R_n + R_{CE}.$$

Here, $\hat{H}_0$ denotes the estimated channel $H_0$. The reconstructed received CRS signal of the target cell is subtracted from the received signal and the covariance matrix estimate reflects the noise plus a channel estimation error dependent $R_{CE}$.

The others may be denoted as Covariance Matrix Estimation for RE with CRS Interference. For each antenna port used by an aggressor CRS signals, a separate Covariance Matrix needs to be computed. The following steps may be required 1. Estimate covariance matrix on CRS disturbed resource elements from $\mathbb{S}_{data}(I_{aggressor})$:

$$y = H_0 s_0 + \sum_{i \in I_{aggressor}} H_i s_i^{CRS} + n \quad (10)$$

and $$\hat{R}_y^{data}(I_{aggressor}) = E[yy^H] \quad (11)$$
$$= H_0 H_0^H + \sum_{i \in I_{aggressor}} H_i H_i^H + R_n$$

by assuming $$E[s_l s_l^H] = I \text{ for all } l \quad (12)$$

and $$E[s_m s_n^H] = 0 \text{ for all } m \neq n. \quad (13)$$

It is noted that this may be done individually for each applicant set $I_{agressor}$.

2. Estimate covariance matrix on CRS-RE of victim signal, i.e.

$$y = H_0 s_0^{CRS} + n \quad (14)$$

and $$\hat{R}_y^{CRS} = E[yy^H] \quad (15)$$
$$= H_0 H_0^H + R_n$$

1. Estimate noise in the same way as described above as Covariance Matrix Estimation for all RE without CRS Interference, i.e.

$$\hat{R}_n^{CRS} = R_n + R_{CE}. \quad (16)$$

A final noise and interference covariance estimate may be given by $$\hat{R}_{I+N}(I_{aggressor}) = \hat{R}_y^{data}(I_{aggressor}) - \hat{R}_y^{CRS} + \hat{R}_n^{CRS} \quad (17)$$
$$= \sum_{i \in I_{aggressor}} H_i H_i^H + R_n + R_{CE}.$$

In an exemplary implementation of the method 400, the interfering signal 104 received from the interfering cell 103 may include Almost Blank Sub-frames (ABS) transmitting the second reference resource elements R2 of the signal pattern.

In an exemplary implementation of the mobile device 107, a whitening filter or a linear detector in the mobile device 107 as described below with respect to FIG. 5 may be adjusted based on the noise and interference covariance measure.

In exemplary an implementation of the method 400 implemented in the mobile device 107, determining the first covariance measure may include determining a first signal covariance measure $R_y^{CRS}$ based on the first reference resource elements R1 of the signal pattern; determining a second signal covariance measure $R_y^{data}$ based on resource elements of the signal pattern different from the first reference resource elements R1; and determining a difference between the first signal covariance measure and the second signal covariance measure as the first covariance measure $R_n^{Interf}$. In the following, such implementation form of the method is described in one example.

Determining the first signal covariance measure $R_y^{CRS}$ based on the first reference resource elements R1 of the signal pattern may be realized by estimating the covariance matrix on CRS-RE of the victim signal, i.e. the target signal 102 of the target cell 101 according to equations (14) and (15) as described above. This needs to be done for every active antenna port separately.

In an exemplary implementation, the first signal covariance measure $R_y^{CRS}$ may be determined based on the first reference resource elements R1 of the two-dimensional signal pattern. Alternatively, $R_y^{CRS}$ may be determined based on data resource elements of the two-dimensional signal pattern or determined based on control resource elements of the two-dimensional signal pattern.

Determining the second signal covariance measure $R_y^{data}$ based on resource elements of the signal pattern different from the first reference resource elements R1 may be realized by estimating the covariance matrix on CRS disturbed resource elements from $S_{data}(I_{aggressor})$ according to equations (10) to (13) as described above. Note that this may be done individually for each applicant set $I_{aggressor}$.

In an exemplary implementation, determining the second signal covariance measure $R_y^{data}$ may be based on second reference resource elements R2 at predetermined positions in the two-dimensional signal pattern. The second reference resource elements R2 may identify a specific interfering cell 103 which is denoted herein as $I_{aggressor}$. When the receive signal 106 is interfered by interfering signals of further interfering cells, the two-dimensional signal pattern may include further reference resource elements Ri at predetermined positions in the signal pattern which may identify further specific interfering cells disturbing the received signal 106. The index i is an index for a respective interfering cell of a plurality of interfering cells. The first reference resource elements R1, the second reference resource elements R2 and further reference resource elements Ri may be located at different positions in the two-dimensional signal pattern.

Determining the difference between the first signal covariance measure and the second signal covariance measure as the first covariance measure $R_n^{Interf}$ may be realized by $$R_n^{Interf} = \hat{R}_y^{data}(I_{aggressor}) - \hat{R}_y^{CRS} \quad (18)$$

In an exemplary implementation of the method, determining the second covariance measure based on resource elements of the signal pattern different from the first reference resource elements R1 may be realized according to equations (8) and (9) as described above.

In an exemplary implementation, determining the noise and interference covariance measure of the received signal 106 based on the first covariance measure and based on the second covariance measure may be realized according to equation (17) as described above.

The method 400 may improve a data throughput in a time-domain eICIC scenario. A performance may be improved and a computational complexity may be smaller than for known solutions. The process of canceling the CRS signals in scenarios with strong interference which requires channel estimation of the aggressor cells, reconstruction of the received interfering signals by multiplying the CRS sequence with the estimated channel and subtraction of this reconstructed signal from the received signal can be avoided when applying method 400. By avoiding this process that may be computationally intensive and may perform best only if the aggressor cell is much stronger than the victim cell and is usually only performed for the strongest aggressor cell, the computational complexity of the method 400 and of a receiver circuit implementing the method 400 can be significantly reduced.

By applying the method 400 as described above, cancellation of the CRS signals may not be required. Such cancellation of CRS signals may require a complete channel estimation of the interfering signal and therefore a large number of computations and a large memory to store the estimates. Cancellation of CRS signals may be very costly in implementation especially if multiple interfering cells are present and may provide only a limited performance benefit.

In case of colliding CRS aggressor cells, i.e. aggressor cells that have their cell-specific reference signal at the same resource element as the victim cell, in a first step joint channel estimation and subsequent cancellation of colliding aggressor cells cell-specific reference signal from the victim cell's cell-specific reference signal may be performed before application of the method 400. In an alternative exemplary implementation, the strongest aggressor cell non-colliding CRS may be canceled before application of the method 400, so complexity and performance of the method 400 can be balanced.

In an exemplary implementation, the method 400 may be applied within LTE outside the eICIC context for improved noise covariance estimation in case of other cell interfering CRS which occurs e.g. in an RBSF not scheduled by the aggressor cell.

Figure 5:
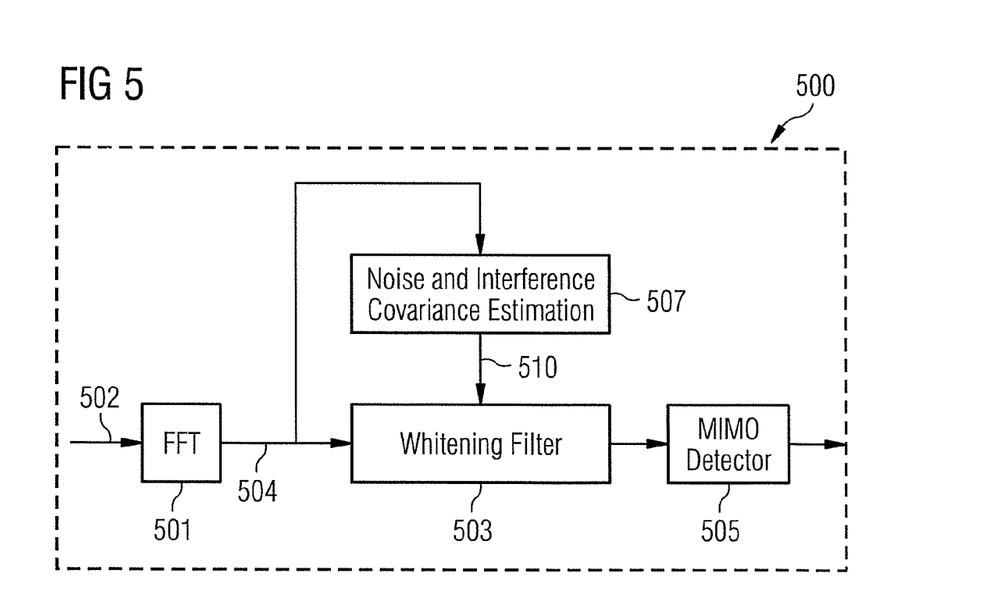
FIG. 5 is a block diagram of a receiver circuit 500 configured to receive a radio frame 200 as described with respect to FIG. 2.

FIG. 5 is a block diagram of a receiver circuit 500 configured to receive a radio frame 200 as described with respect to FIG. 2. The receiver circuit 500 may be implemented in a mobile device 107 as described with respect to FIG. 1 and may implement the method 400 as described with respect to FIG. 4.

The receiver circuit 500 may include an FFT processing circuit 501, a whitening filter 503, a MIMO detector 505 and a noise and interference covariance estimation circuit 507.

The FFT processing circuit 501 may be configured to process a Fast Fourier transform of a receive signal 502 providing a frequency transformed receive signal 504 which may be spectrally whitened by the whitening filter 503 and may be passed to the MIMO detector 505 where multi-paths may be detected in order to estimate the channel. The whitening filter 503 may be adjusted by a noise and interference covariance matrix 510 estimated by the noise and interference covariance estimation circuit 507. The noise and interference covariance estimation circuit 507 may estimate the noise and interference covariance matrix 510 based on the frequency transformed receive signal 504 according to the method 400 as described above with respect to FIG. 4. The receiver circuit 500 may be implemented in a mobile device 107 as described above with respect to FIG. 1.

The noise and interference covariance estimation circuit 507 may estimate the noise and interference covariance matrix 510 by performing the act 403 of determining the first covariance measure as described above with respect to FIG. 4 and by performing the act 405 of determining the second covariance measure as described above with respect to FIG. 4.

The noise and interference covariance estimation circuit 507 may further estimate the noise and interference covariance matrix 510 by performing the act 407 of determining the noise and interference covariance measure based on the first covariance measure and based on the second covariance measure.

The receiver circuit 500 may perform a modified noise and interference covariance estimation on all resource elements including interfering cell specific reference signal elements. This covariance estimate can either be used to compute a whitening filter for the received data as depicted in FIG. 5 which can be used, for example, in case of non-linear detectors like Sphere Decoders, or it can be used directly for a linear detector like interference rejection combining (IRC) or MMSE (not depicted in FIG. 5).

Figure 6:
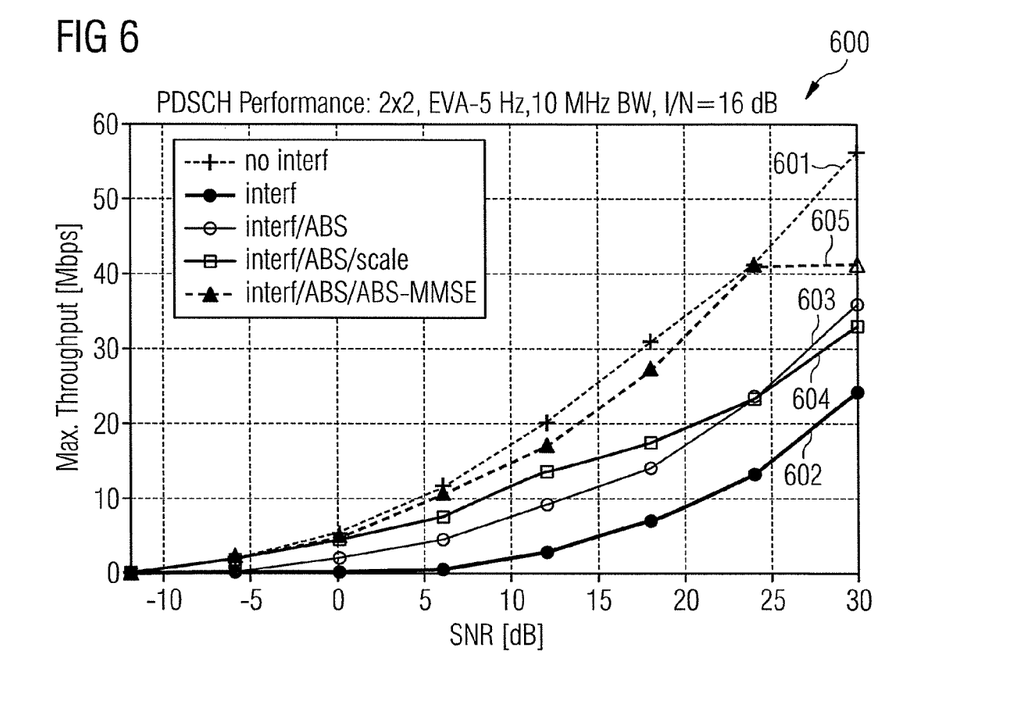
FIG. 6 is a performance diagram 600 illustrating an exemplary performance of the receiver circuit 500 depicted in FIG. 5.

FIG. 6 is a performance diagram 600 illustrating an exemplary performance of the receiver circuit 500 depicted in FIG. 5.

The performance of the receiver circuit 500 is illustrated for a 2×2 system, i.e. two inputs and two outputs, implementing an LTE PDSCH channel with 10 MHz bandwidth, an interference-to-noise ratio of 16 dB and an EVA 5 Hz channel (EVA: extended vehicular A channel according to 3GPP definitions).

The receiver circuit 500 may e.g. be implemented by using the following parameters shown in Table 1:

TABLE 1

Parameters used for the receiver circuit

| Parameter | Value |
| --- | --- |
| Bandwidth | 10 MHz |
| System Configuration (TX × RX) | 2 × 2 |
| Channel Model | EVA 5 Hz |
| Interference to Noise Ratio (INR) | 16 dB |
| Transmission Mode | TM2 and TM3 |
| MCS | MCS 0 & 9 (QPSK)/ MCS 13 & 16 (16 QAM)/ MCS 22 & 27 (64 QAM) |
| Channel Estimation | MMSE-BlockSliding |

The first (uppermost) curve 601 shows the achievable data throughput without any interference. The second (lowermost) curve 602 shows the data throughput with interference and no ABS sub-frame scheduling. The third curve 603 shows the performance with interference and ABS scheduling. The fourth curve 604 shows the performance with interference, ABS scheduling and input scaling. The fifth curve 605 shows the performance of the receiver circuit 500 implementing the method 400 described above with respect to FIG. 4 in a scenario with interference and ABS sub-frame scheduling. The performance may get very close to the case without any interference described by the first curve 601.

Figure 7:
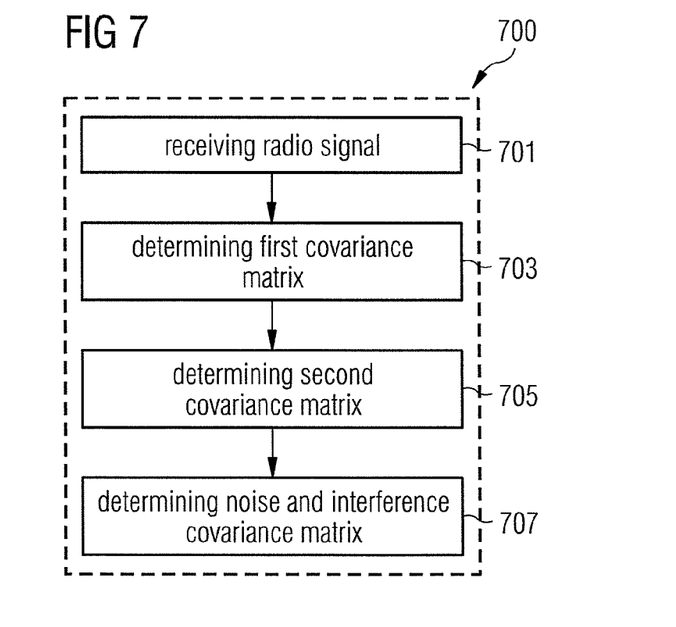
FIG. 7 is a schematic diagram illustrating a method 700 for receiving a radio signal including multiple resource blocks.

FIG. 7 is a schematic diagram illustrating a method 700 for receiving a radio signal including multiple resource blocks.

The method 700 includes receiving a radio signal, the radio signal including a plurality of resource blocks at 701. The method 700 further includes determining a first covariance matrix based on elements of a resource block wherein the elements are not coinciding with a cell-specific reference signal of an interfering cell at 703. The method 700 further includes determining a second covariance matrix based on elements of the resource block wherein the elements are coinciding with the cell-specific reference signal of the interfering cell at 705. The method 700 further includes determining a noise and interference covariance matrix based on the first covariance matrix and based on the second covariance matrix at 707.

In an exemplary implementation, the method 700 may further include determining a further covariance matrix based on elements of the resource block wherein the elements are coinciding with a cell-specific reference signal of a further interfering cell. The method 700 may further include determining the noise and interference covariance matrix based on the first covariance matrix, the second covariance matrix and the further covariance matrix.

While the method 400 can be applied to all kinds of signals received over a communications channel, e.g. wire-line or wireless signals, the method 700 may be applied to radio signals, i.e. signals received over a radio communications channel.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

What is claimed is:
1. A method, comprising:
   receiving a signal comprising a two-dimensional signal pattern in a time-frequency representation in a receiver circuit, the two-dimensional signal pattern comprising first reference resource elements at predetermined positions in the two-dimensional signal pattern;
determining a first covariance measure based on the first reference resource elements of the signal pattern in a first covariance determiner;
determining a second covariance measure based on resource elements of the signal pattern different from the first reference resource elements in a second covariance determiner;
determining a noise and interference covariance measure of the received signal based on the first covariance measure and based on the second covariance measure in a third covariance determiner; and
adjusting a whitening filter or a detector based on the determined noise and interference covariance measure.

2. The method of claim 1, wherein the received signal comprises a superposition of a signal received from a target cell and a signal received from an interfering cell.

3. The method of claim 2, wherein the first reference resource elements of the signal pattern identify the target cell.

4. The method of claim 2, wherein the signal received from the interfering cell comprises Almost Blank Sub-frames transmitting second reference resource elements of the signal pattern.

5. The method of claim 2, wherein the target cell and the interfering cell are dimensioned according to a Long Term Evolution standardization comprising enhanced inter-cell interference coordination.

6. The method of claim 2, wherein the target cell is a pico cell and the interfering cell is a macro cell of a heterogeneous Long Term Evolution network.

7. The method of claim 1, wherein determining the first covariance measure comprises:
determining a first signal covariance measure based on the first reference resource elements of the signal pattern;
determining a second signal covariance measure based on resource elements of the signal pattern different from the first reference resource elements; and
determining a difference between the first signal covariance measure and the second signal covariance measure as the first covariance measure.

8. The method of claim 7, wherein determining the second signal covariance measure is based on second reference resource elements at predetermined positions in the two-dimensional signal pattern, the second reference resource elements identifying a specific interfering cell.

9. The method of claim 8, wherein the first reference resource elements and the second reference resource elements are located at different positions in the two-dimensional signal pattern.

10. The method of claim 7, wherein determining the first signal covariance measure is based on data resource elements of the two-dimensional signal pattern.

11. The method of claim 7, wherein determining the first signal covariance measure is based on control resource elements of the two-dimensional signal pattern.

12. The method of claim 1, wherein the two-dimensional signal pattern comprises further reference resource elements at predetermined positions in the two-dimensional signal pattern identifying a further specific interfering cell disturbing the received signal, the method comprising:
determining the second covariance measure based on the further reference elements of the signal pattern.

13. The method of claim 12, wherein the first reference resource elements and the further reference resource elements are located at different positions in the two-dimensional signal pattern.

14. The method of claim 1, wherein at least one of the first covariance measure, the second covariance measure and the noise and interference covariance measure comprises a covariance matrix.

15. A receiver circuit, configured to receive a signal comprising a two-dimensional signal pattern in a time-frequency representation, the two-dimensional signal pattern comprising first reference resource elements at predetermined positions in the two-dimensional signal pattern, the receiver circuit comprising:
a first unit configured to determine a first covariance measure based on the first reference resource elements of the signal pattern;
a second unit configured to determine a second covariance measure based on resource elements of the signal pattern different from the first reference resource elements;
a third unit configured to determine a noise and interference covariance measure of the received signal based on the first covariance measure and based on the second covariance measure; and
a whitening filter or a detector configured to receive the noise and interference covariance measure, and further configured to be adjusted based on the received noise and interference covariance measure.

16. The receiver circuit of claim 15, further comprising:
a first signal covariance measure unit configured to determine a first signal covariance measure based on the first reference resource elements of the signal pattern;
a second signal covariance measure unit configured to determine a second signal covariance measure based on resource elements of the signal pattern different from the first reference resource elements; and
a difference unit configured to determine a difference between the first signal covariance measure and the second signal covariance measure as the first covariance measure.

17. The receiver circuit of claim 15, further comprising:
a whitening filter, wherein the receiver circuit is configured to adjust the whitening filter based on the noise and interference covariance measure; or
a detector, wherein the receiver circuit is configured to adjust the detector based on the noise and interference covariance measure.

18. A method, comprising:
receiving a radio signal in a receiver circuit, the radio signal comprising a plurality of resource blocks;
determining a first covariance matrix in a first covariance determiner based on elements of a resource block wherein the elements are not coinciding with a cell-specific reference signal of an interfering cell;
determining a second covariance matrix in a second covariance determiner based on elements of the resource block wherein the elements are coinciding with the cell-specific reference signal of the interfering cell;
determining a noise and interference covariance matrix in a third covariance determiner based on the first covariance matrix and based on the second covariance matrix; and
adjusting a whitening filter or a detector based on the determined noise and interference covariance matrix.

19. The method of claim 18, further comprising:
determining a further covariance matrix, the further covariance matrix being determined based on elements of the resource block wherein the elements are coinciding with a cell-specific reference signal of a further interfering cell; and determining the noise and interference covariance matrix based on the first covariance matrix, the second covariance matrix and the further covariance matrix.

20. A device, configured to receive a radio signal comprising a plurality of resource blocks, the device comprising:
- a first covariance determiner configured to determine a first covariance matrix based on elements of a resource block wherein the elements are not coinciding with a cell-specific reference signal of an interfering cell;
- a second covariance determiner configured to determine a second covariance matrix based on elements of the resource block wherein the elements are coinciding with the cell-specific reference signal of the interfering cell;
- a third covariance determiner configured to determine a noise and interference covariance matrix based on the first covariance matrix and based on the second covariance matrix; and
- a whitening filter or a detector configured to receive the noise and interference covariance matrix, and further configured to be adjusted based on the received noise and interference covariance matrix.

* * * * *